(12) United States Patent
Marinelli

(10) Patent No.: US 8,403,007 B1
(45) Date of Patent: Mar. 26, 2013

(54) RIVET PLUMBING REPAIR APPARATUS AND METHOD

(76) Inventor: Vittorio Marinelli, Deerfield Beach, FL (US)

( * ) Notice: Subject to any disclaimer, the term of this patent is extended or adjusted under 35 U.S.C. 154(b) by 70 days.

(21) Appl. No.: 13/154,405

(22) Filed: Jun. 6, 2011

Related U.S. Application Data

(63) Continuation-in-part of application No. 12/608,999, filed on Oct. 29, 2009, now Pat. No. 7,954,517.

(51) Int. Cl.
*F16L 55/16* (2006.01)

(52) U.S. Cl. ............... 138/99; 138/97; 411/43; 220/237; 29/402.02

(58) Field of Classification Search .............. 138/99, 138/97; 29/402.02; 411/43; 220/243, 237
See application file for complete search history.

(56) References Cited

U.S. PATENT DOCUMENTS

| | | | | |
|---|---|---|---|---|
| 2,531,270 A | * | 11/1950 | Hood | 411/43 |
| 4,436,467 A | * | 3/1984 | Larsson et al. | 411/34 |
| 4,509,243 A | * | 4/1985 | Schneider et al. | 29/402.02 |
| 5,020,572 A | * | 6/1991 | Hunt | 138/99 |

* cited by examiner

*Primary Examiner* — Patrick F Brinson
(74) *Attorney, Agent, or Firm* — Allen D. Hertz, P.A.; Allen D. Hertz

(57) ABSTRACT

A repair process for a puncture through a plumbing pipe, the process initiates with a step of machining a puncture hole to a uniformly shaped hole having a diameter for receiving a repair rivet. The process continues by inserting and securing a blind rivet through the hole. The rivet can be sealed via any of a variety of methods, including using a solderable rivet and soldering the rivet to the pipe, utilizing a sealed blind rivet, combined with a gasket assembled between a rivet flange and the pipe surface. For two punctures, a section of coupling material can be utilized, sized to cover both punctures. The section is assembled to the pipe by inserting the rivet through both the section and the pipe, securing the rivet, then soldering the coupling to the pipe. A rivet end seal can be assembled to an end of a common blind rivet creating a watertight seal.

20 Claims, 19 Drawing Sheets

RIVET PLUMBING REPAIR APPARATUS AND METHOD

CROSS-REFERENCE TO RELATED APPLICATION

This Continuation-In-Part Patent Application claims the benefit of U.S. Provisional patent application Ser. No. 12/608,999, filed Oct. 29, 2009 (Issuing on Jun. 7, 2011 as U.S. Pat. No. 7,954,517).

FIELD OF THE INVENTION

The present invention relates to a pipe hole repair apparatus, and more particularly, sizing an inadvertent hole of a copper pipe wall, inserting a solderable blind rivet or repair plug therethrough, and soldering the rivet or plug, thus securing and sealing the rivet or plug in position.

BACKGROUND OF THE INVENTION

The invention pertains to a plumbing pipe repair method of repair and respective apparatus.

When completing work around a structure, such as a residence, a commercial building, and the like, comprising plumbing, there is a risk of damaging or puncturing the plumbing. A simple drilling operation or installation of a drywall screw can puncture the wall of a pipe. The hardship is finding a method to repair the damaged pipe while causing a minimal amount of additional damage to the area.

One known method of repairing the damaged pipe is by removing a section of wall covering to provide sufficient working space. At times, the piping is embedded into a concrete or other poured material, such as foam and the like. This enhances the difficulties in a repair process. The section of damaged pipe is cut and removed. The cutting process requires sufficient clearance. A pipe coupling is slipped over the two sections of pipe providing a splice between them. The interior of the pipe needs to be sufficiently dried to allow for soldering (sometimes referred to as sweating). The area needs to be prepared to ensure against any fire from heat applied during the soldering process. A flux is applied to the pipe tubing and the pipe coupling member. The joint is formalized by soldering the pipe coupling member to the pipe tubing.

Accordingly, there remains a need in the art for a device that provides a method to repair the damaged pipe while causing a minimal amount of additional damage to the area.

SUMMARY OF THE INVENTION

The present invention overcomes the deficiencies of the known art and the problems that remain unsolved by providing a method and respective apparatus for repairing a puncture through a copper pipe.

In accordance with one embodiment of the present invention, the invention consists of a method for repairing a hole inadvertently created through a pipe, the method comprising the steps of:
 enlarging the hole to a diameter for receiving a solderable rivet;
 inserting the solderable rivet into the hole;
 securing the solderable rivet into the hole via a deformation step; and
 forming a watertight seal between the solderable rivet and the pipe.

In one aspect, the watertight seal is formed by soldering the solderable rivet to the pipe.

Yet another aspect, the watertight seal is formed by a gasket assembled between the solderable rivet and the pipe.

While another aspect, the seal can further seal a plurality of holes, utilizing a section of a coupling member, the coupling section being first riveted to the pipe, covering the plurality of holes, then soldered to the pipe providing a seal.

With yet another aspect, the method further comprises a step of drying an interior of the pipe section Yet another aspect, the solderable rivet includes a rivet body being fabricated of copper, brass, and any other solderable material. The copper can be coated with an organic protectant, thus increasing the solderability of the copper surface.

Regarding another aspect, the solderable rivet includes a rivet body being coated with a solder material such copper cladding, copper plating, nickel plating, gold plating, gold plating over nickel, and the like.

In accordance with a second embodiment of the present invention, the invention consists of a method for repairing a hole inadvertently created through a pipe, the method comprising the steps of:
 enlarging the hole to a diameter for receiving a sealed rivet;
 inserting the sealed rivet into the hole;
 securing the sealed rivet into the hole via a deformation step; and
 forming a watertight seal between the sealed rivet and the pipe.

In yet another aspect, the sealed rivet being in a form factor of a blind rivet, comprising a mandrel for deforming the body and a sealed end about a bulbous end of the mandrel.

In another aspect, the repair process incorporates a rivet end seal element, wherein the rivet end seal element is inserted into the sized pipe repair hole, a rivet is inserted into a rivet body receptacle of the rivet end seal element, and the rivet is secured into position. A gasket seal can be placed between the pipe and a seal member retention flange of the rivet end seal member to provide a reliable watertight seal. Alternatively, the rivet and/or rivet end seal member may be fabricated of a solderable material. Solder would be applied between the flanges and the pipe, creating a reliable watertight seal.

In another aspect, a pipe repair plug is provided having a plug body. The plug body can be defined by several sections: a hollowed cylindrical sidewall having a plug end wall at a first end and a plug flange at a second end. The plug end wall is contiguous about the first end of the sidewall, creating a watertight section. The flange retains the plug in position while being secured in position by a soldering process.

In another aspect, a pipe repair plug is provided having a plug body. The plug body can be defined by several sections: a solid cylindrical sidewall extending perpendicularly from a plug flange. The solid cylindrical sidewall is sized to be inserted into a sized repair hole. The flange retains the plug in position while being secured in position by a soldering process. The soldering process creates a watertight seal.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
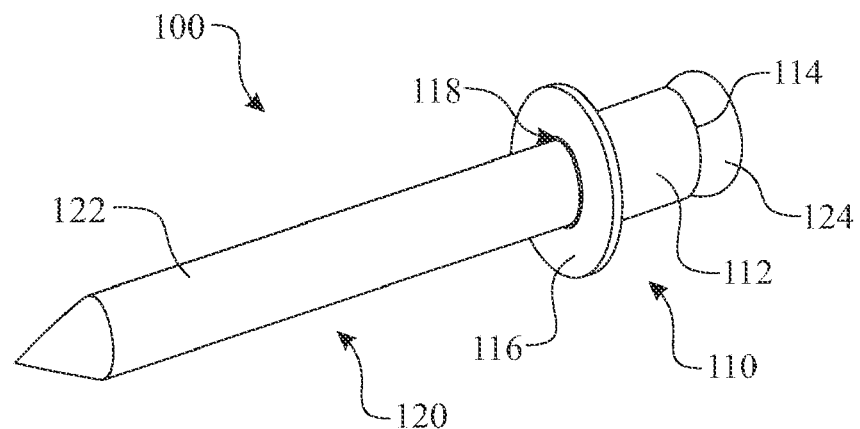
FIG. 1 presents an isometric view of a solderable blind rivet assembly.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
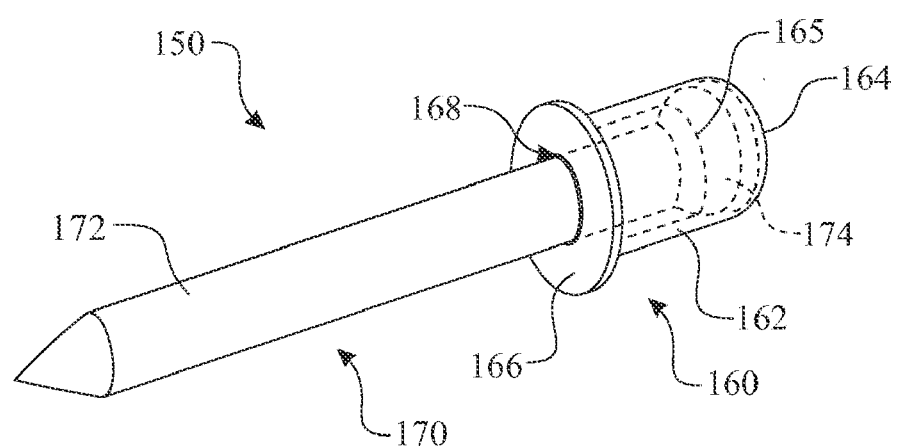
FIG. 2 presents an isometric view of a sealed blind rivet assembly.
Figure 3:
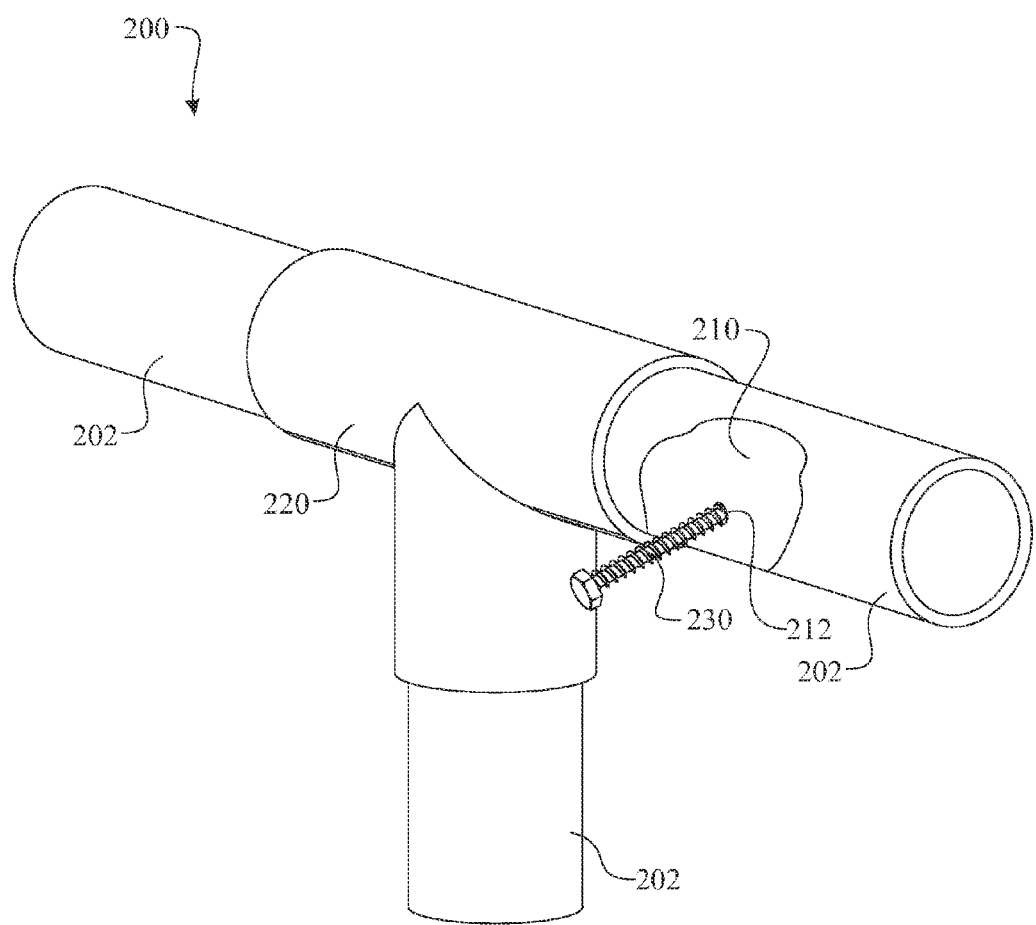
FIG. 3 presents an isometric view of a screw puncturing a piping assembly.
Figure 4:
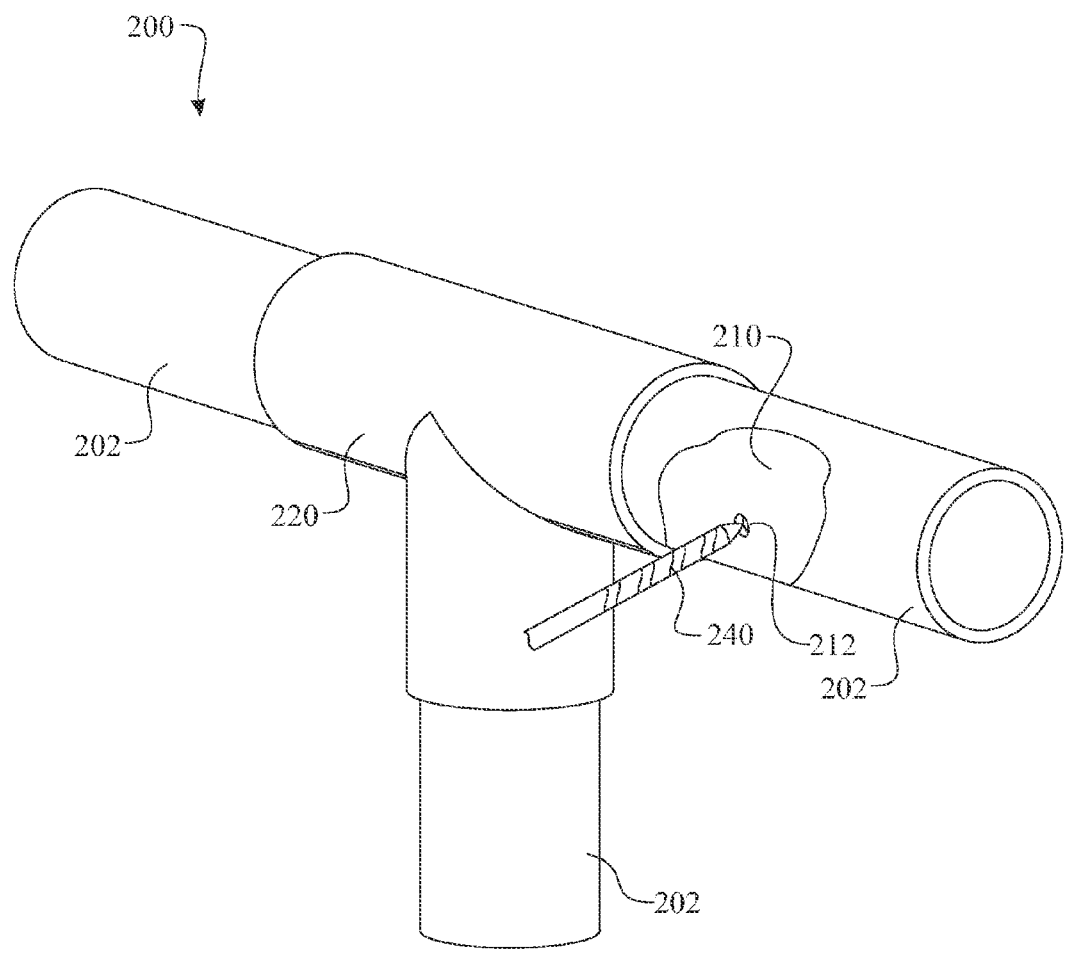
FIG. 4 presents an isometric view of a drill bit sizing the punctured location of the piping assembly.
Figure 5:
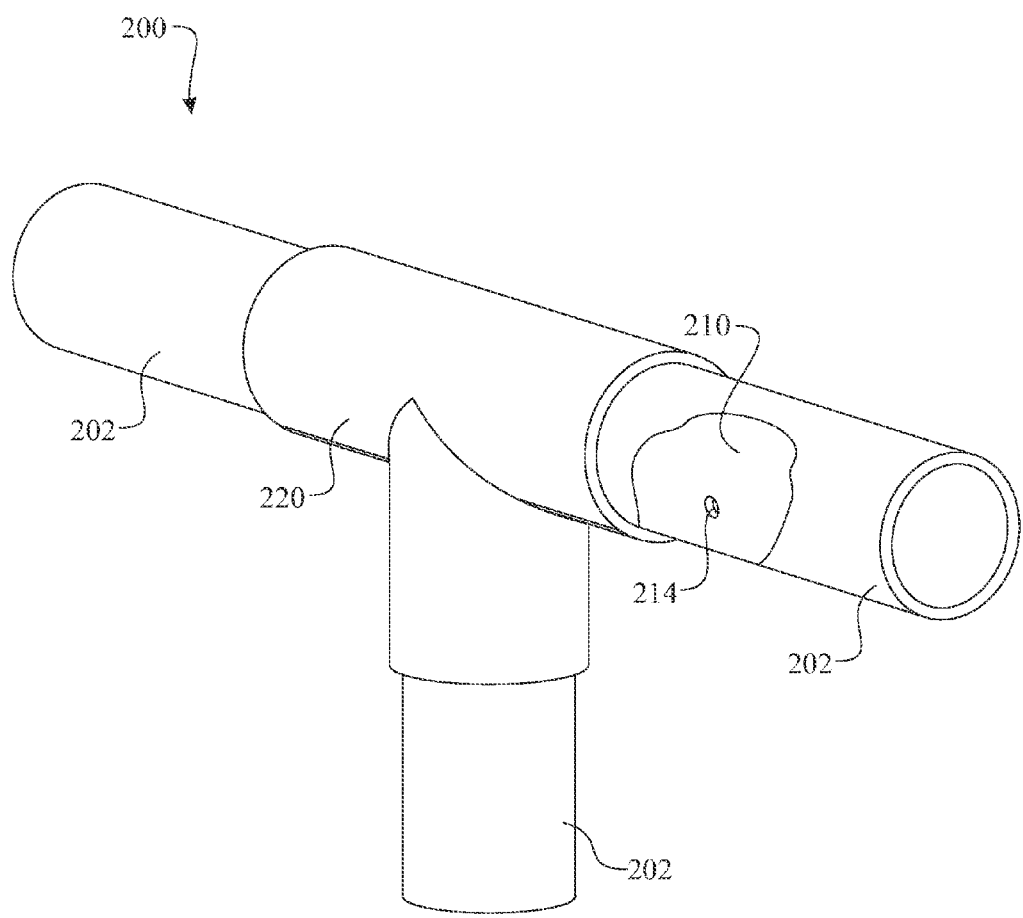
FIG. 5 presents an isometric view of a sized hole through the piping assembly.
Figure 6:
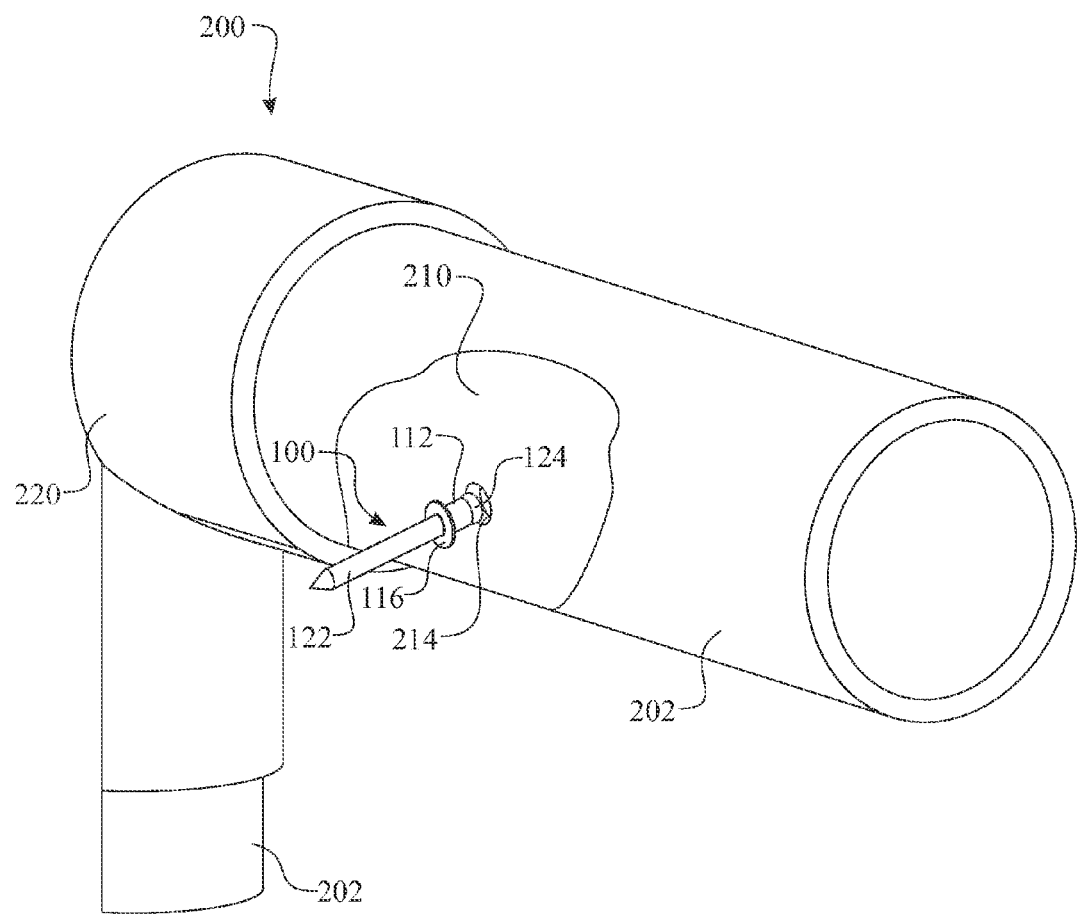
FIG. 6 presents an isometric view of a blind rivet being inserted into the sized hole of FIG. 5.
Figure 7:
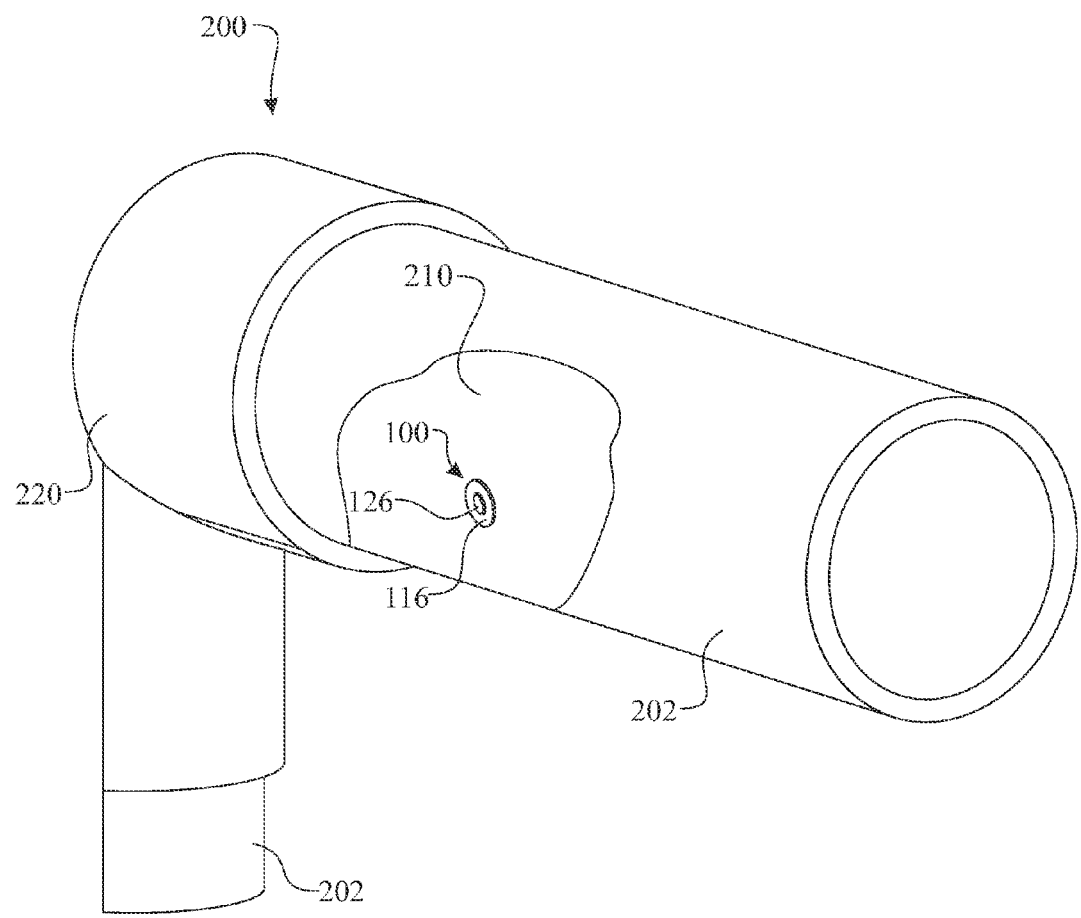
FIG. 7 presents an isometric view of the blind rivet secured within the sized hole of FIG. 5.
Figure 8:
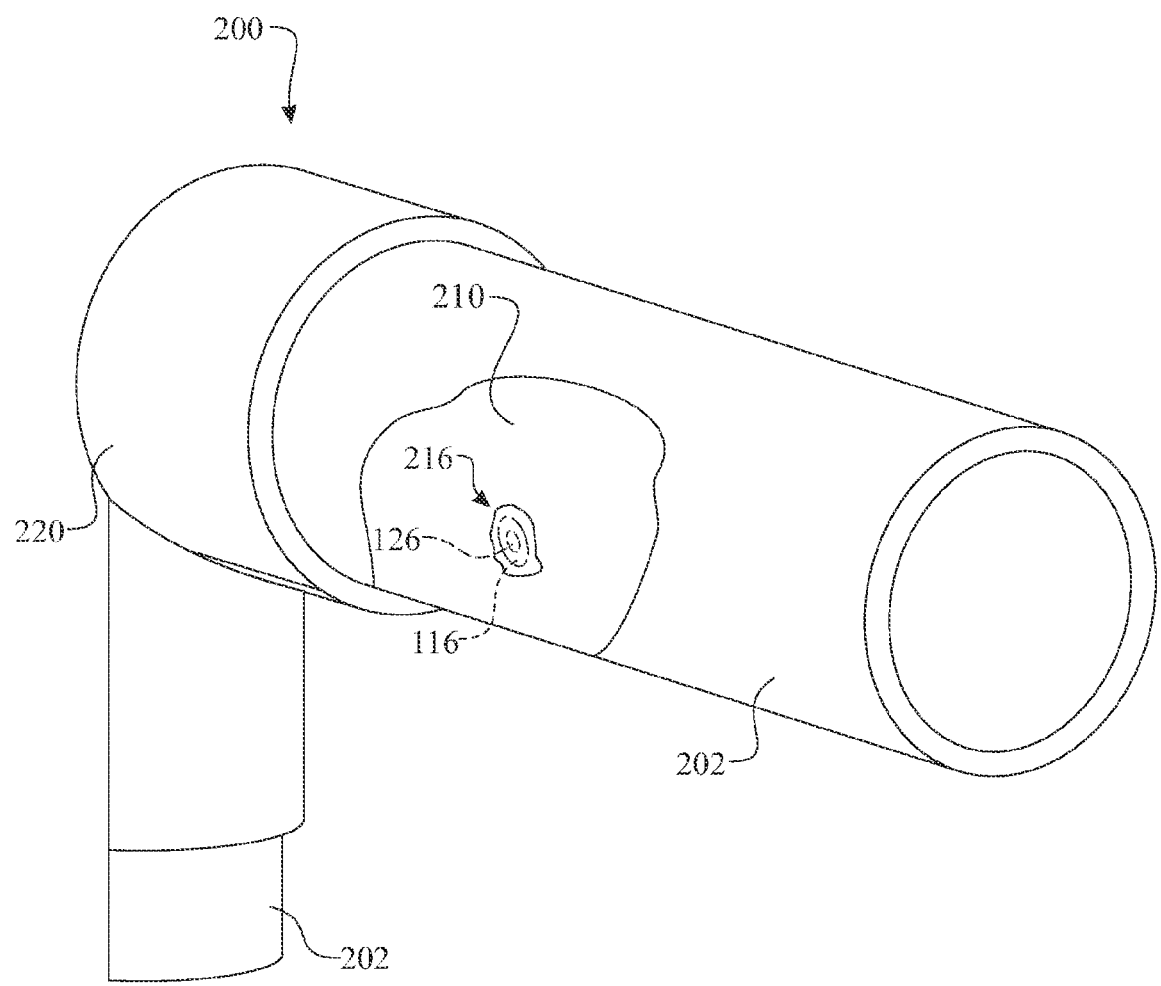
FIG. 8 presents an isometric view of the blind rivet soldered to the pipe.
Figure 9:
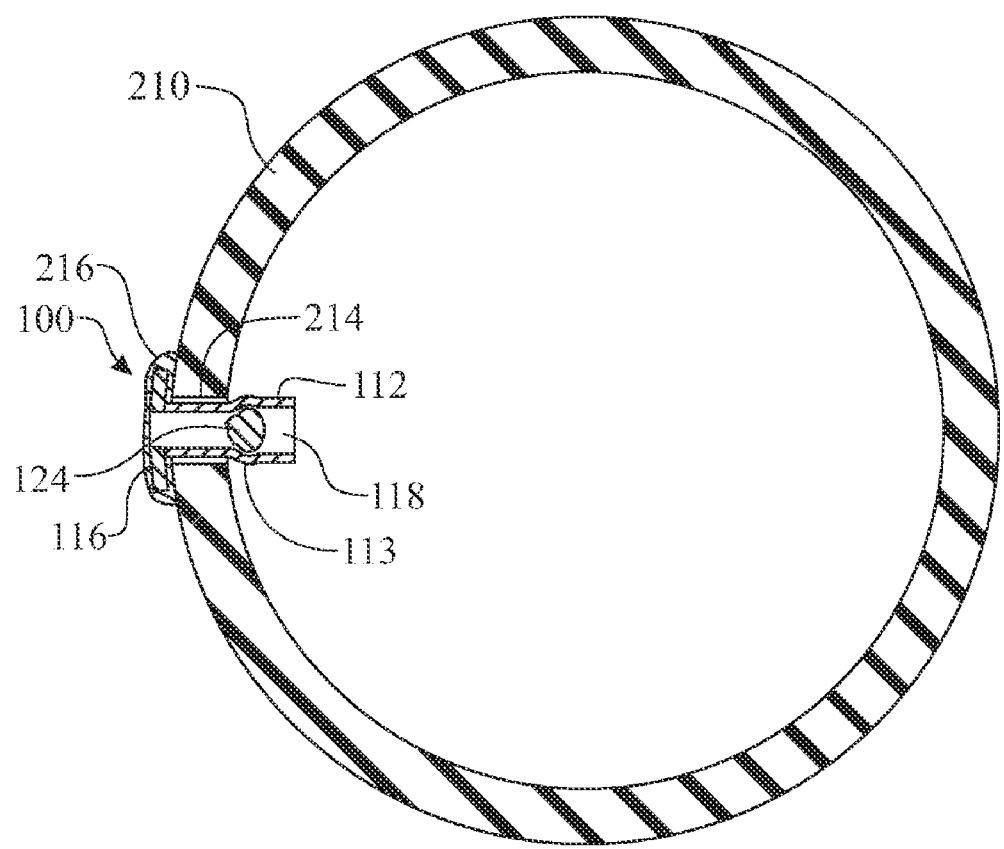
FIG. 9 presents a sectional view illustrating the blind rivet as assembled through the sized hole.

The present invention utilizes two form factors of rivets, with a solderable blind rivet assembly 100 being illustrated in FIG. 1 and a sealed blind rivet assembly 150 being illustrated in FIG. 2. The solderable blind rivet assembly 100 is fabricated having a mandrel 120 inserted through a solderable blind rivet body 110. The solderable blind rivet body 110 is formed including a rivet shank 112 with a rivet flange 116 extending radially outward and generally perpendicular from a periphery of a sealing edge of the rivet shank 112. The mandrel 120 is formed having a mandrel shank 122 with a body expander 124 provided at a forming end. The rivet shank 112 is hollow, providing the mandrel passage 118 for the passage of the mandrel shank 122. The body expander 124 is formed having a diameter that is greater than a diameter of a mandrel passage 118 and resides against a shank end 114 of the rivet shank 112. When the mandrel shank 122 is pulled forward from the solderable blind rivet body 110, the body expander 124 deforms the rivet shank 112, expanding it to generate a clamping force between the deformed portion of the rivet shank 112 and a contacting surface (proximate the shank) of the rivet flange 116.

The piping assembly 200 is fabricated having a mandrel 170 inserted through a solderable blind rivet body 160. The solderable blind rivet body 160 is formed including a rivet shank 162 with a rivet flange 166 extending radially outward and generally perpendicular from a periphery of a sealing edge of the rivet shank 162. The mandrel 170 is formed having a mandrel shank 172 with a body expander 174 provided at a forming end. The rivet shank 162 is hollow, providing the mandrel passage 168 for the passage of the mandrel shank 172. The body expander 174 is formed having a diameter that is greater than a diameter of a shank wall interior diameter reduction 165 and resides against a rear edge of the shank wall interior diameter reduction 165 of the rivet shank 162. When the mandrel shank 172 is pulled forward from the solderable blind rivet body 160, the body expander 174 deforms the rivet shank 162, expanding it to generate a clamping force between the deformed portion of the rivet shank 162 and a contacting surface (proximate the shank) of the rivet flange 166.

An exemplary embodiment of the present invention is represented as a piping assembly 200 providing descriptive illustrations shown in FIGS. 3 through 9. The piping assembly 200 illustrates an exemplary plumbing configuration consisting of a series of pipes 202, 210 coupled via a pipe coupling 220. It is understood the plumbing can be provided in any configuration. The plumbing is normally provided within a wall, floor, ceiling, ground, and the like. The plumbing can be damaged via any of a variety of methods. In the exemplary illustration, a screw 230 is driven through a copper pipe 202 (as understood) creating a puncture 212 in the copper pipe 202, referenced collectively as a damaged pipe section 210. Once the copper pipe 202 is punctured, the water should be turned off to the respective juncture of pipes. The repair process consists of removing the screw 230 to determine the extent of the damage, demolish a small area of the building about the damaged pipe section 210 to provide a reasonable working area, and repair the damaged pipe section 210.

The puncture 212 is prepared for insertion of the solderable blind rivet assembly 100 via a using a drill bit 240 through the puncture 212 to create a sized hole 214. The drill bit 240 is sized to provide a sized hole 214 for accepting the rivet shank 112. The rivet shank 112 can be provided in a variety of outer diameters for use for repairing a variety of diameter of holes with minimal intrusion. The rivet shank 112 is inserted though the sized hole 214, seating the rivet flange 116 against the exterior surface of the damaged pipe section 210. A rivet gun (not shown, but well understood) is used to install and secure the solderable blind rivet assembly 100 to the damaged pipe section 210. The gun can apply an insertion force to the rivet flange 116, ensuring the rivet flange 116 remains in contact with the surface of the damaged pipe section 210. The gun then draws the mandrel shank 122 away from the copper pipe 202 while continuing to apply a seating pressure to the rivet flange 116. The drawing force pulls the body expander 124 outward, deforming the rivet shank 112, illustrated as deformed shank 113 shown in FIG. 9. The deformation of the rivet shank 112 creates a clamping force with the rivet flange 116. The mandrel 120 snaps upon a predetermined tensile force, leaving a snapped mandrel 126 (the body expander 124 and a short portion of the mandrel shank 122) in position. The plumber then applies a flux (not shown) to the inserted solderable blind rivet assembly 100 and the adjacent area of the damaged pipe section 210. The solderable blind rivet assembly 100 and adjacent region of the damaged pipe section 210 is heated and solder is applied. The solder flows, wetting to both the rivet flange 116 and the damaged pipe section 210, creating a watertight solder seal 216. The plumber then turns the water on, checking the repair for leaks.

Figure 10:
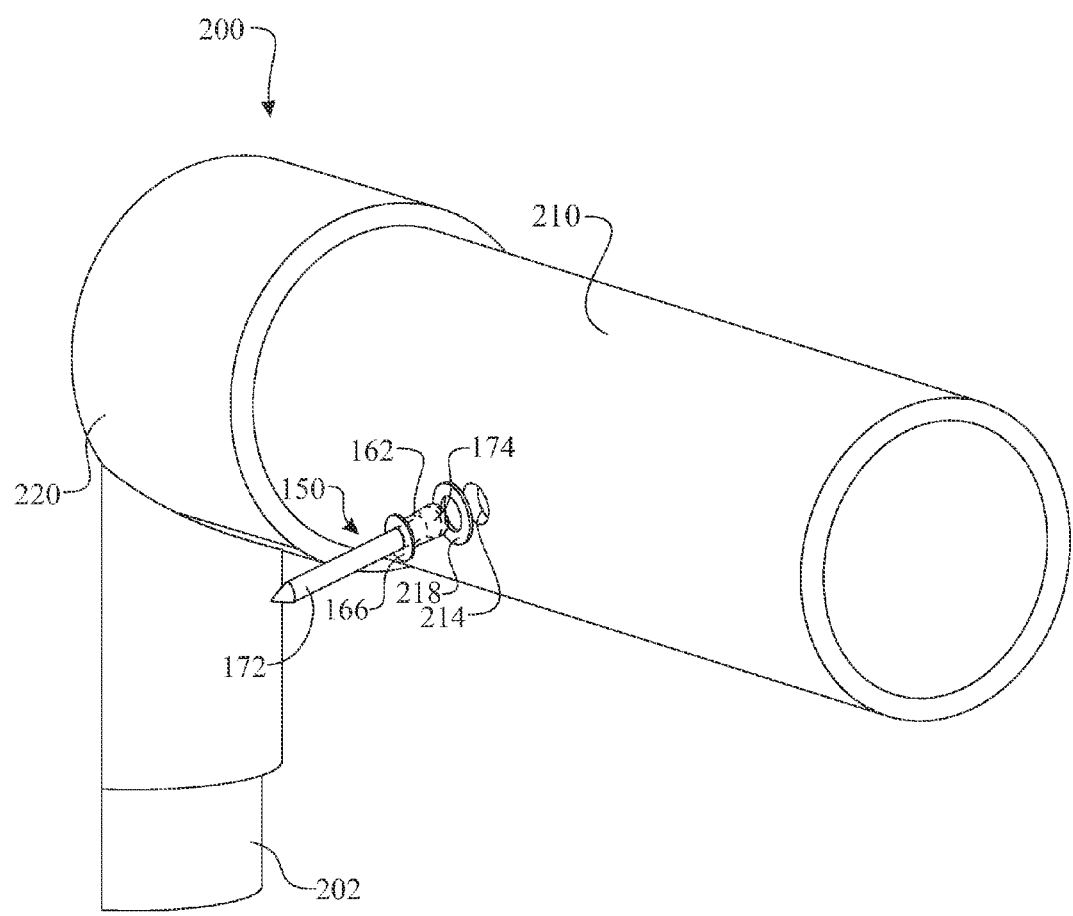
FIG. 10 presents an isometric view of a sealed rivet and a gasket seal being inserted into the sized hole of FIG. 5.
Figure 11:
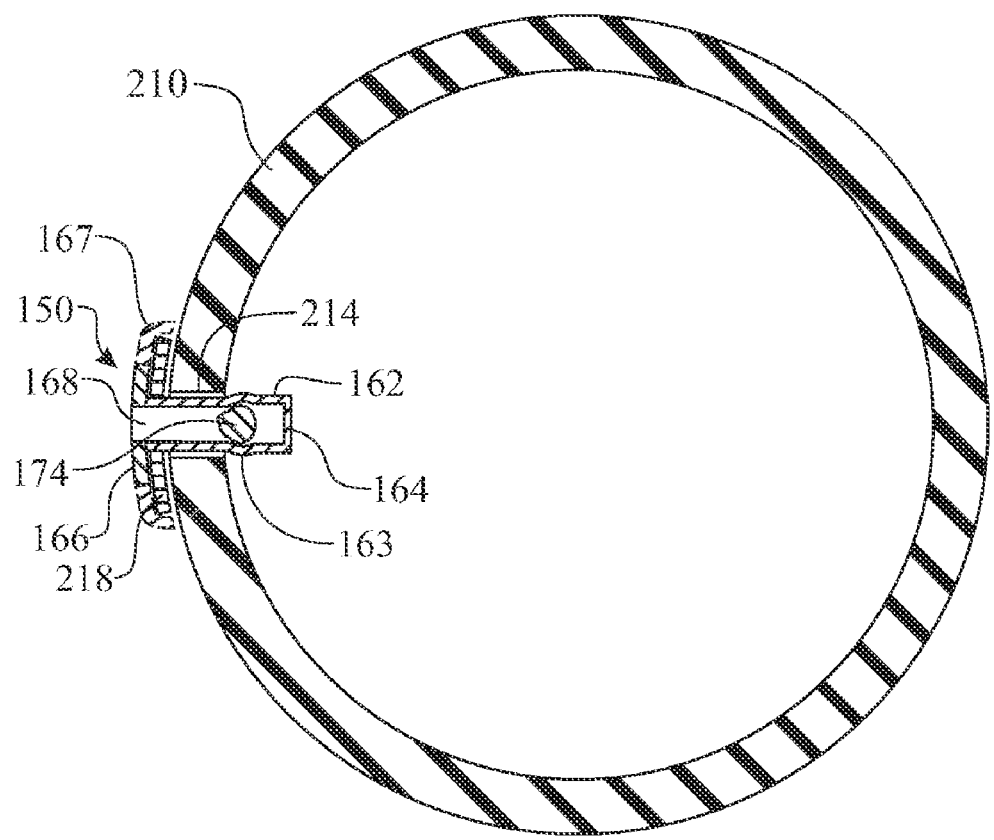
FIG. 11 presents a sectional view illustrating the sealed rivet and the respective gasket seal as assembled through the sized hole.

An alternate repair process is presented in FIGS. 10 and 11. The damage is prepared as described above, reshaping the puncture 212 into a sized hole 214. A gasket seal 218 is placed over the rivet shank 162 of the sealed blind rivet assembly 150. The gasket seal 218 can be a stamped piece of gasket material, an o-ring, a shaped piece of rubber, a nylon ring, and the like. The rivet shank 162 is then inserted into the sized hole 214. The contacting surface of the rivet flange 166 is adequately seated against the damaged pipe section 210, sandwiching the gasket seal 218 therebetween. The mandrel shank 172 is drawn from the rivet shank 162, while a seating force remains applied to the rivet flange 166. The motion of the mandrel shank 172 pulls the body expander 174 outward, deforming the rivet shank 162 (illustrated as deformed rivet shank 163 shown in FIG. 11), creating a clamping force between the deformed portion of the rivet shank 162 and the rivet flange 166. The clamping force compresses the gasket seal 218, creating a watertight joint. An optional gasket containment rim 167 can be provided about a perimeter of the rivet flange 166, ensuring the gasket seal 218 remains in place. The shank end 164 provides a seal for the sealed blind rivet assembly 150, where the sealed blind rivet assembly 150 would normally include a passageway, such as the mandrel passage 118 (FIG. 1).

Figure 12:
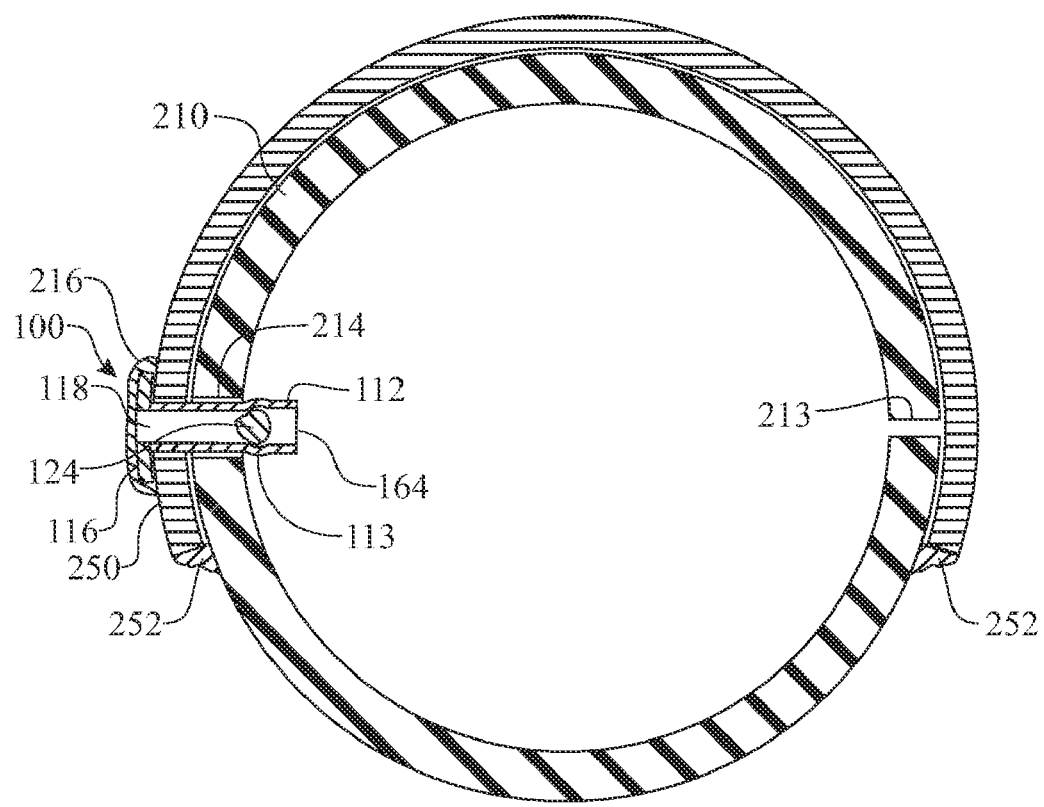
FIG. 12 presents a sectional view illustrating the sealed rivet and a coupling member section for sealing two puncture locations through a pipe.

A third exemplary embodiment is presented in FIG. 12, providing a means for repairing a damaged pipe section 210 comprising two holes, a puncture 212 (illustrated as a sized hole 214) and a concealed puncture 213. This normally occurs when a screw initially penetrates the copper pipe 202 and continues through to a second penetration on a portion of the pipe generally opposite the first hole. It is generally easier to access the portion of the pipe having the sized hole 214, compared to the ability to access the portion of the pipe having the concealed puncture 213. The illustrated repair process provides a simple means for repairing a damaged pipe section 210 comprising two punctured sections. The damage is prepared as described above, reshaping the puncture 212 into a sized hole 214. A sectioned coupling member 250 is provided, wherein the sectioned coupling member 250 is a section of a pipe coupling member sized for the respective damaged pipe section 210. The section is preferably between 180 and 270 degrees of the overall circumference of the coupling member. A hole (similar to the sized hole 214) is provided through the sectioned coupling member 250. The sectioned coupling member 250 is placed over the damaged pipe section 210 covering both the sized hole 214 and the concealed puncture 213, aligning the hole of the sectioned coupling member 250 with the sized hole 214. A solderable blind rivet assembly 100 is then inserted through the aligned holes and secured as previously described. The solderable blind rivet assembly 100 is secured as previously described. The sectioned coupling member 250 is then soldered to the damaged pipe section 210 by applying a flux, applying heat, then having solder contact the heated assembly. The solder flows about the perimeter of the sectioned coupling member 250 forming a soldered interface 252. Additionally, solder is applied over the rivet flange 116 creating a solder seal 216. It is understood that the sealed blind rivet assembly 150, including a respective gasket seal 218, can be used replacing the solderable blind rivet assembly 100, thus eliminating the step of applying solder over the solderable blind rivet assembly 100. It is understood the repair process can be alternately accomplished applying a watertight adhesive to a contacting side of the sectioned coupling member 250 and securing the sectioned coupling member 250 to the damaged pipe section 210 using the sealed blind rivet assembly 150.

Figure 13:
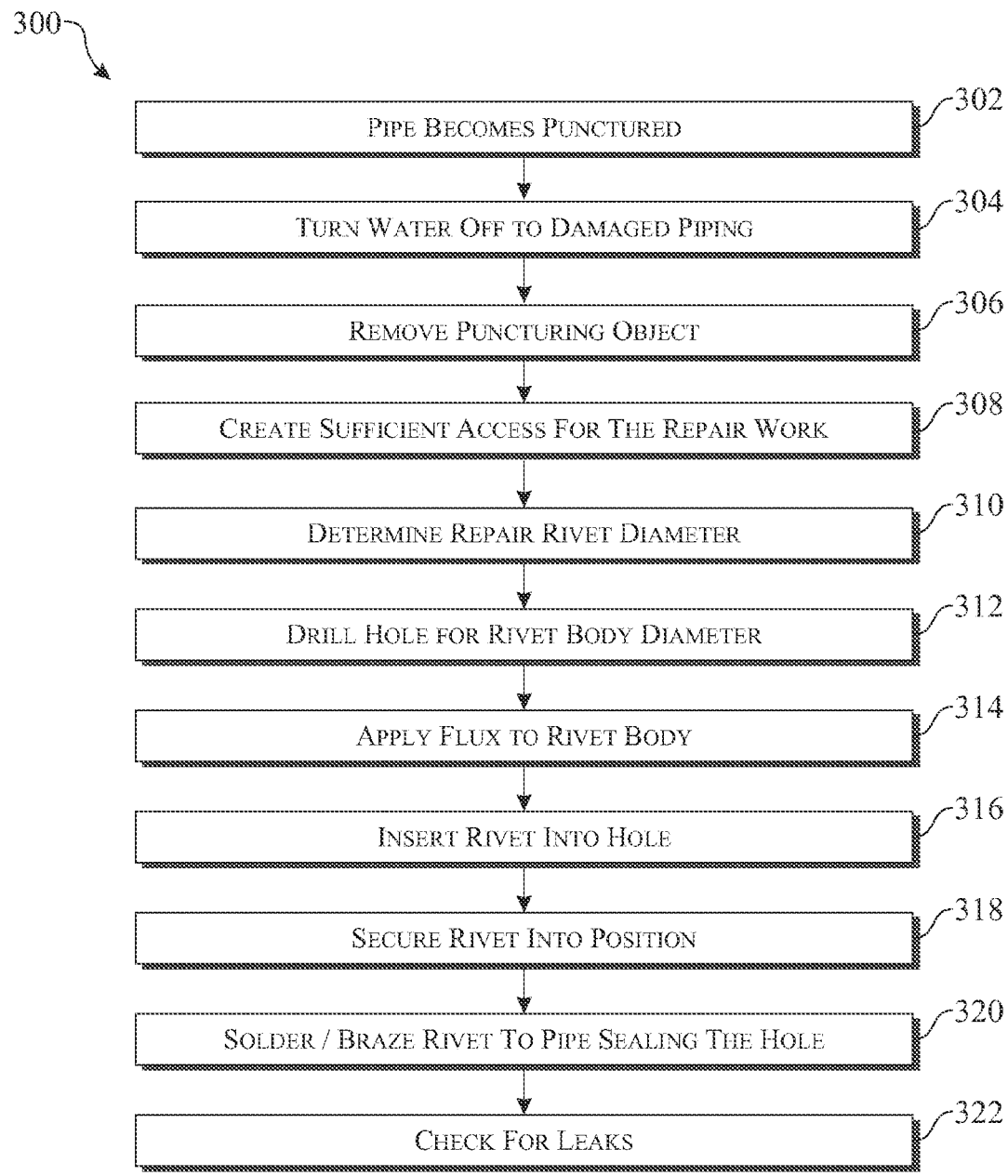
FIG. 13 presents a flow diagram detailing a puncture repair method using a solderable rivet.

A blind rivet repair process 300 is described in a flow diagram presented in FIG. 13. The blind rivet repair process 300 initiates with an unfortunate step of the copper pipe 202 inadvertently becoming punctured 302. The repair process begins by turning the water pressure flowing to the damaged pipe section 210 off 304. The repair process 300 continues with a step of removing the puncturing object 306. The area surrounding the damaged pipe section 210 is cleared, providing access 308 for the repair process. The damaged is assessed and the diameter of the repair rivet is determined 310. A drill bit 240 matching the diameter of the repair rivet is selected and the puncture is machined 312 to receive the rivet. Flux may be applied 314 to the rivet shank 112 as well as the section of pipe being repaired. The solderable blind rivet assembly 100 is then inserted 316 into the sized hole 214. The solderable blind rivet assembly 100 is secured 318 via a standard blind rivet installed process, preferably using a blind rivet installation tool (commonly known as a rivet gun). The damaged pipe section 210 is heated and solder is applied to seal the rivet and pipe interface in accordance with a soldering or brazing process 320. The water pressure is carefully increased; checking the repair for leaks 322.

Figure 14:
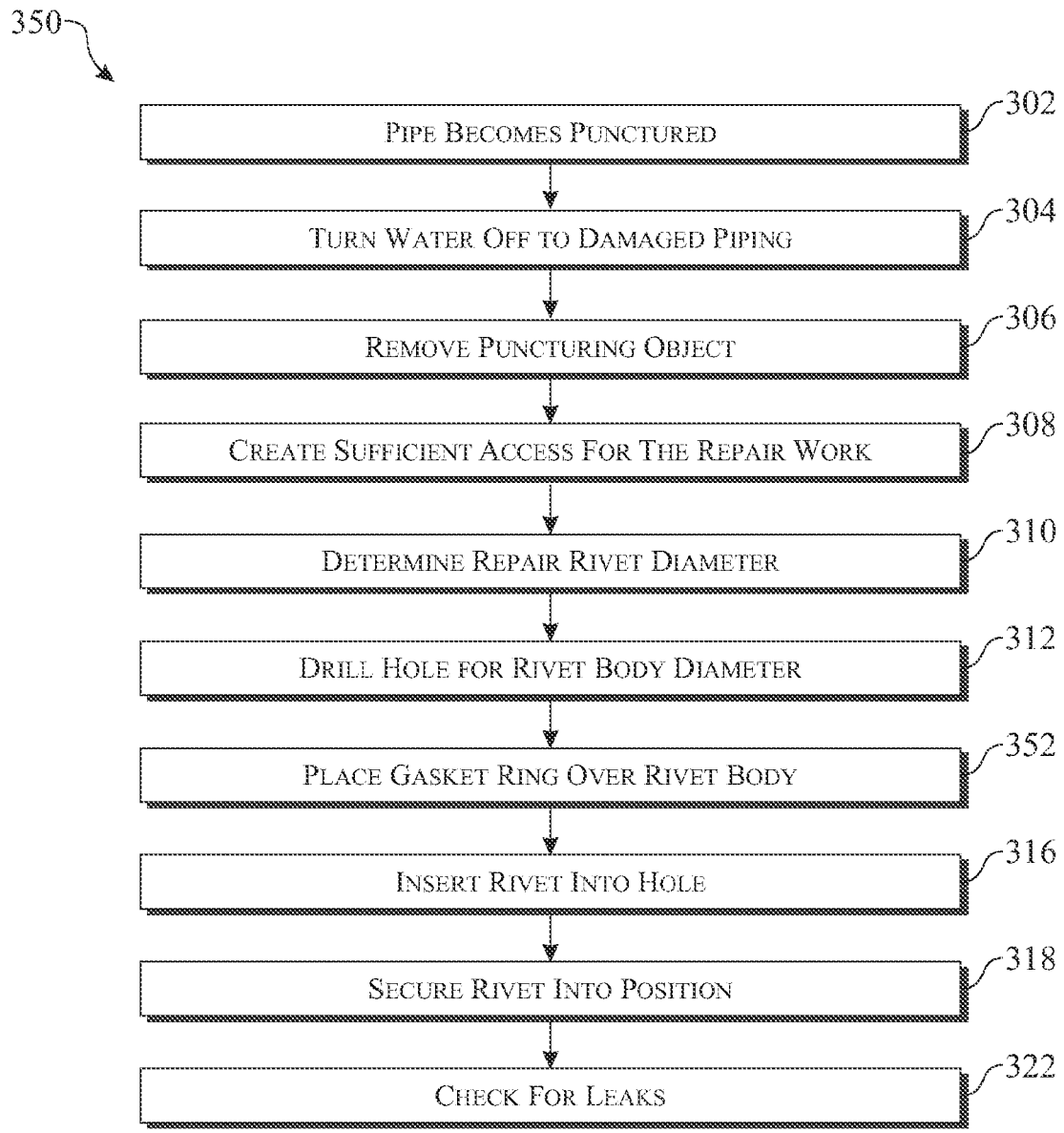
FIG. 14 presents a flow diagram detailing a puncture repair method using a sealed rivet.
Figure 15:
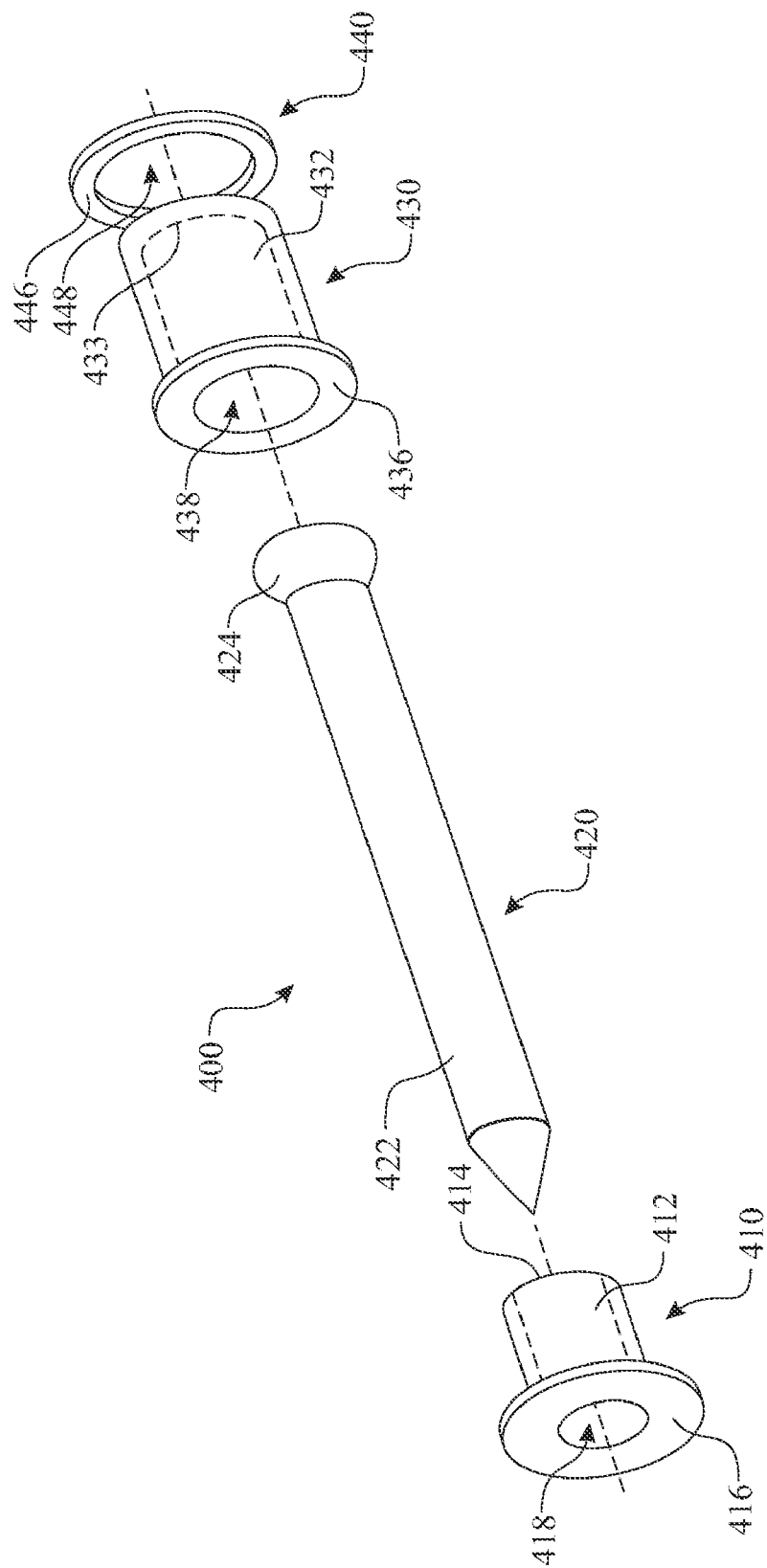
FIG. 15 presents an isometric exploded assembly view of an exemplary multi piece blind rivet seal assembly comprising a rivet body, a mandrel, a rivet end seal component, and a gasket seal.
Figure 16:
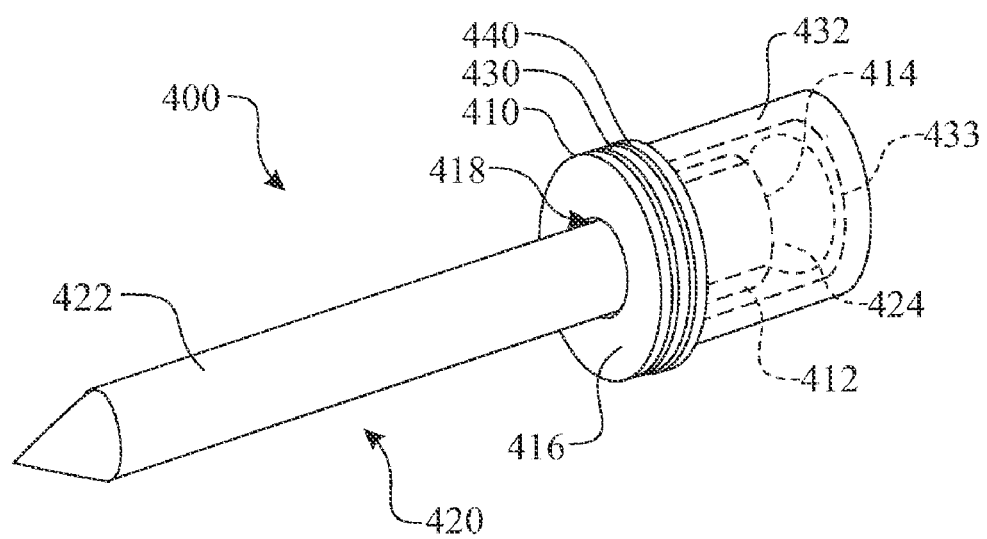
FIG. 16 presents an isometric view of the exemplary multi piece blind rivet seal assembly introduced in FIG. 15, with the rivet assembly illustrated in an assembled configuration.

A sealed rivet repair process 350 is described in a flow diagram presented in FIG. 14. The sealed rivet repair process 350 adheres to the initial preparation steps of the blind rivet repair process 300. The process deviates after the hole to match the rivet body diameter is drilled 312. The gasket seal 218 is placed over the rivet shank 162 in accordance with a gasket installation step 352. The sealed blind rivet assembly 150 is inserted 316 into the sized hole 214. The sealed blind rivet assembly 150 is secured 318 via a standard blind rivet installed process, preferably using a blind rivet installation tool (commonly known as a rivet gun). The installation of the sealed blind rivet assembly 150 tightens about the gasket seal 218, creating a watertight seal. The water pressure is carefully increased; checking the repair for leaks 322.

Figure 17:
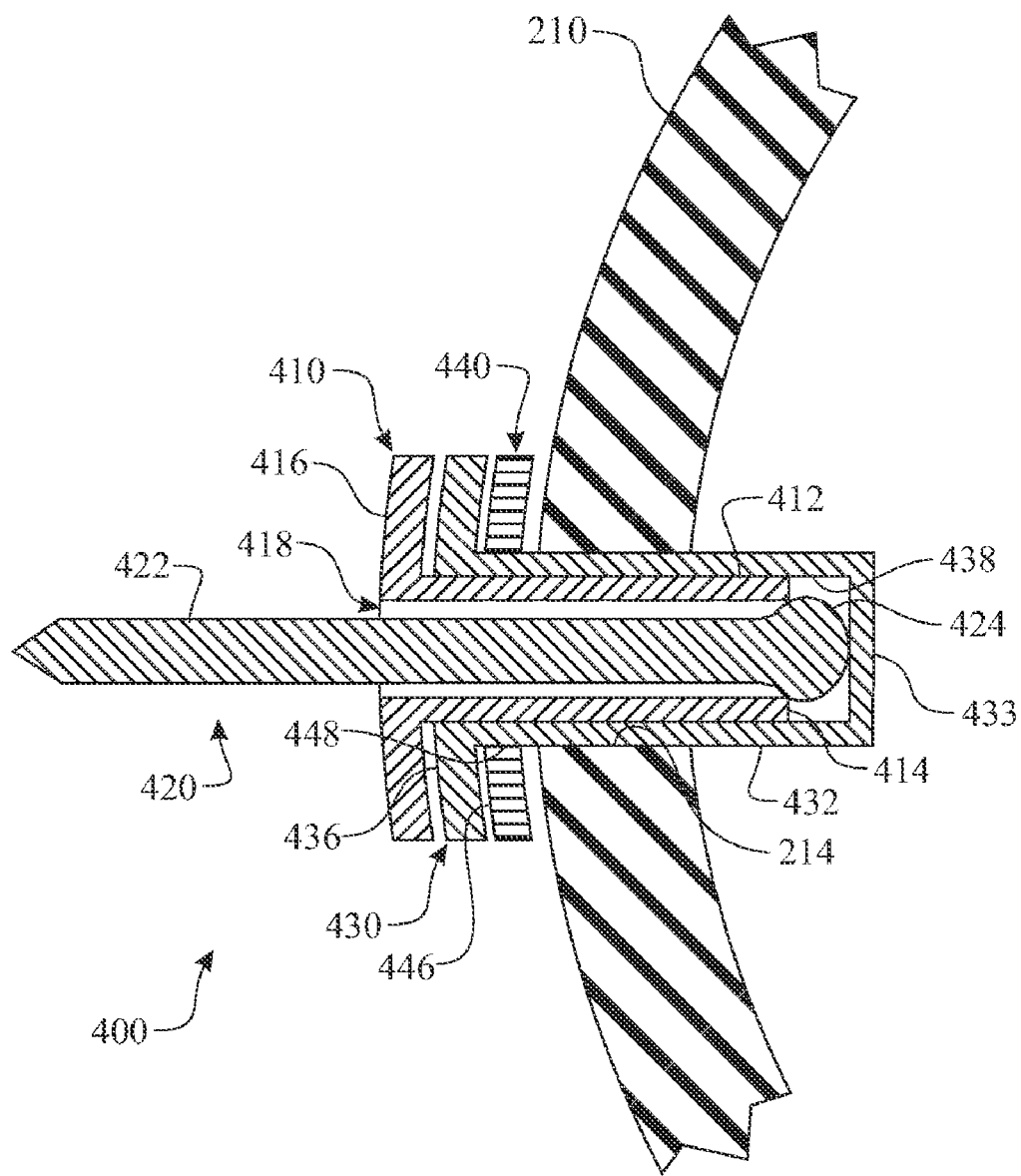
FIG. 17 presents a side elevation sectioned view of the exemplary multi piece blind rivet seal assembly introduced in FIG. 15, with the rivet assembly shown inserted into a damaged pipe.
Figure 18:
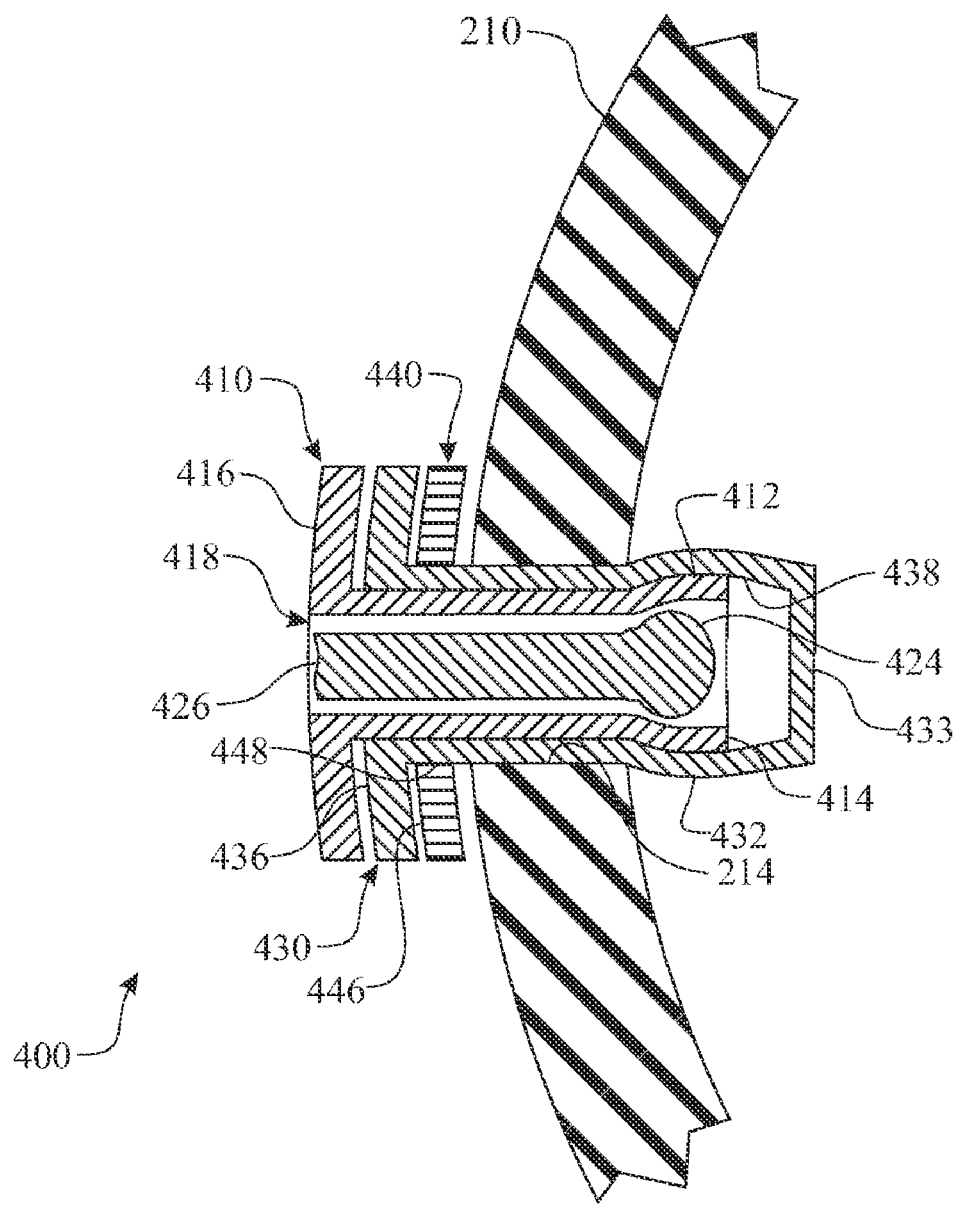
FIG. 18 presents a side elevation sectioned view of the exemplary multi piece blind rivet seal assembly introduced in FIG. 15, with the rivet assembly shown secured through and sealing a damaged pipe.

The process can be enhanced using a multi piece blind rivet seal assembly 400, as illustrated in FIGS. 15 through 18. The multi piece blind rivet seal assembly 400 comprises a blind rivet body 410, a mandrel 420, a rivet end seal component 430 and an optional gasket seal 440. The blind rivet body 410 and mandrel 420 are similar to the solderable blind rivet body 110 and mandrel 120. Like features of blind rivet body 410 and solderable blind rivet body 110 are numbered the same except preceded by the numeral '4'. Like features of mandrel 420 and mandrel 120 are numbered the same except preceded by the numeral '4'. A mandrel shank 422 of the mandrel 420 is inserted through a mandrel passage 418 of the blind rivet body 410. The rivet end seal component 430 comprises a cylindrical body portion 432 extending perpendicularly from a seal member retention flange 436. The seal member retention flange 436 extends outward from a circumference about an insertion end of the cylindrical body portion 432. The seal member retention flange 436 is designed to seat against the damaged pipe section 210 with a gasket seal 440 sandwiched therebetween creating a watertight seal. Alternatively, the seal member retention flange 436 can be seated directly against the damaged pipe section 210 and soldered thereto creating a watertight seal. It would be preferred that the seal member retention flange 436 have a slight concave surface (as shown in FIGS. 17 and 18) to aid in creating a reliable watertight seal. The concave shape of the seal member retention flange 436 would aid in deforming the seal member retention flange 436 to contour to the curvature of the mating pipe surface. An interior of the cylindrical body portion 432 creates a rivet body receptacle 438. A seal end wall 433 is formed at an insertion end of the cylindrical body portion 432 creating a watertight section thereof.

The rivet end seal component 430 can be fabricated of any malleable material, including plastic, nylon copper, aluminum, steel, stainless steel, brass, bronze, and the like. For metallic based versions, the rivet end seal component 430 is preferably formed using a drawing and/or punching process. This process is conducive to creating the cylindrical body portion 432 and respective seal end wall 433. A stamping, punch, or rolling process can be used to form the seal member retention flange 436. It is recognized that other metal forming process may be used including spinning, lathe forming, screw forming machines, and the like. The material can be cleaned to aid in a soldering process. The rivet end seal component 430 may be subject to anodizing, plating, painting, and the like, to improve the solderability, adhesion to a gasket material, corrosion resistance, and the like. For plastic, nylon, and the like versions, the rivet end seal component 430 can be fabricated using a molding process, a spinning process, and the like.

The gasket seal 440 includes a gasket 446, which is fabricated of a pliant material, such as rubber, nylon, silicone, and the like. A gasket aperture 448 is provided through the gasket 446 for receiving the cylindrical body portion 432 therethrough. The gasket seal 440 can be fabricated using any reasonable manufacturing process, including molding, stamping, and the like.

The plumber prepares the puncture of the damaged pipe section 210 by drilling a sized hole 214 through the puncture. The sized hole 214 provides a circular shaped aperture for snugly receiving the cylindrical body portion 432 of the multi piece blind rivet seal assembly 400. If the multi piece blind rivet seal assembly 400 is going to be soldered to the damaged pipe section 210, the plumber can prepare the area of the damaged pipe section 210 proximate the sized hole 214 by cleaning, abrading, sanding, chemically preparing, applying a flux, and the like.

The components of the multi piece blind rivet seal assembly 400 can be in either a kit form, partially assembled, or as a single, assembled unit. In any of the offered configurations, the user would insert rivet end seal component 430 into the sized hole 214. The cylindrical body portion 432 can optionally be inserted through the gasket aperture 448 of the gasket seal 440 where a cylindrical body portion 432 provides a watertight seal. The gasket seal 440 can be omitted for solder sealing applications. The rivet shank 412 is inserted into the rivet body receptacle 438, seating the rivet flange 416 against the exposed surface of the seal member retention flange 436. The repair person inserts the mandrel shank 422 into jaws of a pop-rivet gun. Pressure is applied against the rivet flange 416, pressing the rivet flange 416 and seal member retention flange 436 towards the damaged pipe section 210. The mandrel shank 422 is drawn forward pulling the body expander 424 against the shank end 414 of the blind rivet body 410. As the body expander 424 continues forward, the body expander 424 deforms the rivet shank 412 outward, enlarging the diameter of the rivet shank 412. The enlargement of the rivet shank 412 is transferred to the cylindrical body portion 432, thus being enlarged accordingly. The deformation of the cylindrical body portion 432 draws the rivet flange 416 towards the damaged pipe section 210 and creates a mechanical interface between the rivet end seal component 430 and a wall of the damaged pipe section 210. The process draws a contact surface of the seal member retention flange 436 and an exterior surface of the damaged pipe section 210 together, thus applying a sealing pressure to the gasket seal 440. Upon a predetermined tension, the mandrel shank 422 is designed to shear during the drawing process resulting in a snapped mandrel 426. The body expander 424 remains retained within the rivet end seal component 430.

The multi piece blind rivet seal assembly 400 enables the repair person to utilize a common rivet in conjunction with the rivet end seal component 430 and optional gasket seal 440 to repair a damaged pipe section 210.

Where the gasket seal 440 is omitted, the repair person can solder the interface between the seal member retention flange 436 and/or the rivet flange 416 and the damaged pipe section 210. The process would include an application of a flux onto the seal member retention flange 436 and/or the rivet flange 416 and the damaged pipe section 210. Solder is then applied to the interface forming the desired reliable watertight interface.

It is understood that the multi piece blind rivet seal assembly 400 can include a sectioned coupling member 250 to repair a cracked pipe, a concealed puncture 213 and the like, similar to the repair process previously illustrated in FIG. 12.

Figure 19:
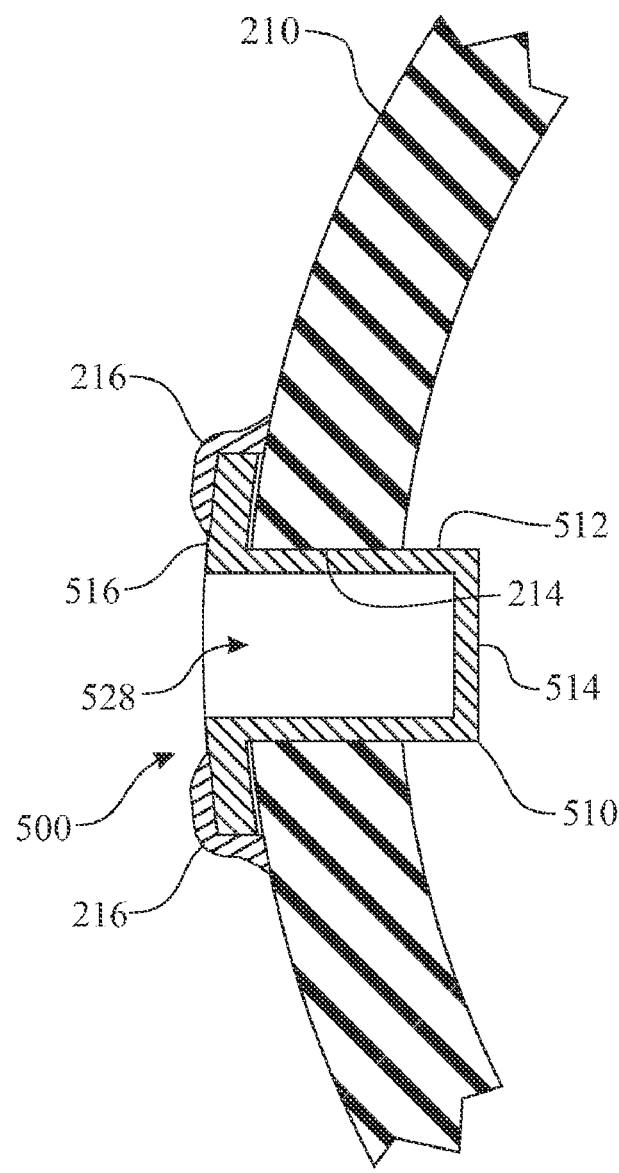
FIG. 19 presents a side elevation sectioned view of an exemplary hollowed pipe repair plug.

Another alternate embodiment can utilize a hollowed pipe repair plug 500 for repairing a damaged pipe section 210 as illustrated in FIG. 19. The hollowed pipe repair plug 500 is designed and fabricated having features similar to the rivet end seal component 430 previously described herein. The hollowed pipe repair plug 500 is fabricated having a plug body 510. The plug body 510 includes a plug cylindrical sidewall 512 extending from a plug flange 516 and terminating at a plug end wall 514. The plug flange 516 extends outward from a circumference about an insertion end of the plug cylindrical sidewall 512. It is preferred that an exterior diameter of the plug cylindrical sidewall 512 has a dimension matching a diameter of an aperture formed by a common drill bit.

The repair person prepares the damaged pipe section 210 as previously described, and then inserts the plug cylindrical sidewall 512 into the sized hole 214. The repair person can apply flux to the damaged pipe section 210 adjacent the sized hole 214 and the plug flange 516. Alternatively, the repair person can use solder having a flux core. The area is heated and solder is applied forming a solder seal 216 between a perimeter of the plug flange 516 and the adjacent region of the damaged pipe section 210.

Figure 20:
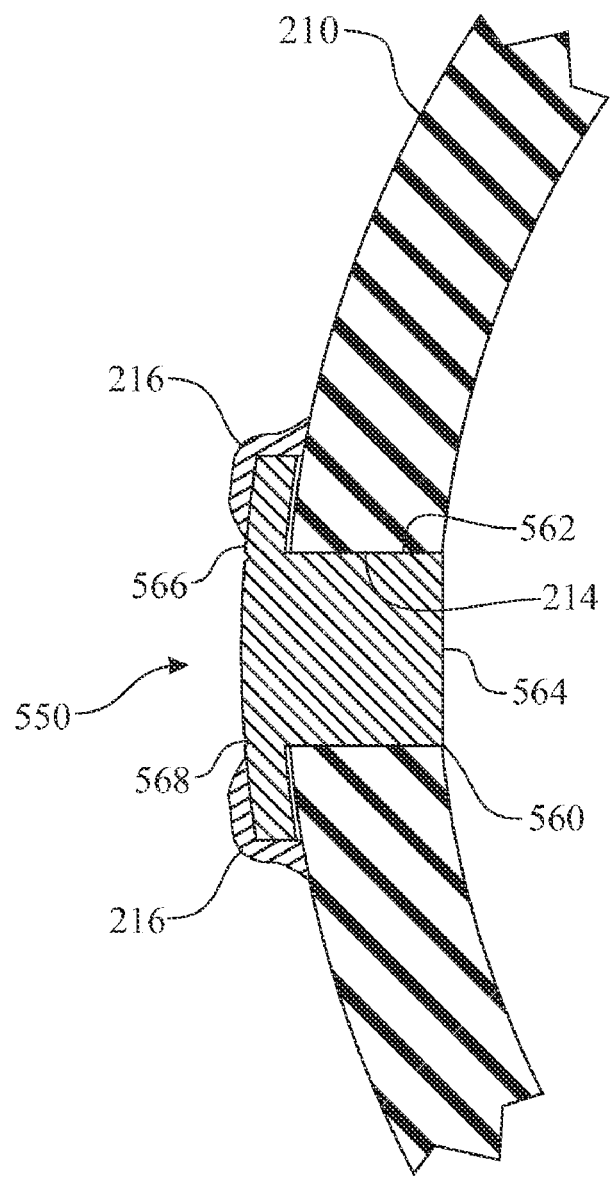
FIG. 20 presents a side elevation sectioned view of an exemplary solid pipe repair plug.

A hollowed pipe repair plug 550 is a modified version of the hollowed pipe repair plug 500 as illustrated in FIG. 20. The hollowed pipe repair plug 550 is similar to the hollowed pipe repair plug 500 previously described herein, wherein a plug cylindrical sidewall 562 of the hollowed pipe repair plug 550 is solid compared to the hollowed plug cylindrical sidewall 512. The plug cylindrical sidewall 512 and plug end wall 514 forms a hollowed central region 528. A thin walled material, provided by hollowing the central portion of the plug cylindrical sidewall 512, enhances the soldering process. The thin wall material reduces any heat sinking, increasing the thermal transfer during the soldering process. The hollowed central region 528 can alternatively or additionally receives the rivet shank 412 of the blind rivet body 410 therein, as previously described. The hollowed pipe repair plug 550 is fabricated having a plug body 560. The plug body 560 includes a plug cylindrical sidewall 562 extending from a plug flange 566. The plug flange 566 extends outward from a circumference about an insertion end of the plug cylindrical sidewall 512. A thermal barrier 568 can be included circumferentially about the plug flange 566 proximate an interface between the plug flange 566 and the plug cylindrical sidewall 562. The plug flange 566 can be provided in a form of a groove. The plug flange 566 retains the heat within the plug flange 566 during the soldering process and avoids any heat sinking that may be encountered by the plug cylindrical sidewall 562. It is preferred that an exterior diameter of the plug cylindrical sidewall 562 has a dimension matching a diameter of an aperture formed by a common drill bit.

The repair person prepares the damaged pipe section 210 as previously described, and then inserts the plug cylindrical sidewall 562 into the sized hole 214. The repair person can apply flux to the damaged pipe section 210 adjacent the sized hole 214 and the plug flange 566. Alternatively, the repair person can use solder having a flux core. The area is heated and solder is applied forming a solder seal 216 between a perimeter of the plug flange 566 and the adjacent region of the damaged pipe section 210. The optional thermal barrier 568 retains the heat within the plug flange 566 to aid the soldering process.

The length of the plug cylindrical sidewall 512 enables the insertion of the blind rivet body 410. It is noted that the length of the plug cylindrical sidewall 562 (distance between a contacting surface of the plug flange 566 and a plug end wall 564) is shown where the length is approximately the thickness of the pipe wall, thus minimizing any impact to a flow of fluid passing through the piping. It is understood that the hollowed pipe repair plug 500 can be sized where the plug cylindrical sidewall 512 has a length that is approximately the thickness of the pipe wall. In some applications, the length of the plug cylindrical sidewall 512 and plug cylindrical sidewall 562 can be shorter than the thickness of the pipe wall, while still maintaining mechanical integrity.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A pipe repair process, the process comprising steps of:
    enlarging and shaping a perforation of a pipe wall to a sized hole having a diameter for receiving a pipe repair plug, said pipe repair plug comprising:
        a pipe repair plug body having a cylindrical sidewall and pipe repair plug flange formed about a perimeter of a flange end of said pipe repair plug body, said body being fabricated of a solderable material and said cylindrical sidewall is watertight;
    inserting said cylindrical sidewall into said sized hole; and
    securing said pipe repair plug into said sized hole, seating said pipe repair plug flange against an exterior surface of said pipe wall and forming a watertight seal between a blind rivet and said pipe by applying solder to said pipe repair plug flange and said pipe wall exterior surface to create a solder joint between said pipe repair plug flange and said pipe wall exterior surface.

2. A pipe repair process as recited in claim 1, the process further comprising a step of inserting a pipe repair plug comprising a cylindrical sidewall extending a length from a contacting surface of said pipe repair plug flange, wherein said length is approximately a thickness of said pipe wall.

3. A pipe repair process as recited in claim 1, enhancing the step of applying solder by reducing a thermal mass of said pipe repair plug.

4. A pipe repair process as recited in claim 3, the step of reducing a thermal mass of said pipe repair plug is accomplished by utilizing said pipe repair plug wherein said cylindrical sidewall is tubular, and further comprising an end wall, wherein said end wall is contiguous about a peripheral edge of an insertion end of said cylindrical sidewall maintaining said watertight attribute.

5. A pipe repair process as recited in claim 4, the process further comprising a steps of inserting a rivet shank of a blind rivet into an interior within said tubular cylindrical sidewall, said blind rivet comprising:
    a blind rivet body having a blind rivet tubular section and blind rivet flange formed about a perimeter of a flange end of said blind rivet body, and
    a mandrel comprising a mandrel shank having a body expander at an expansion end of said mandrel, wherein said mandrel is assembled through said tubular section positioning such to expand a diameter of said blind rivet body when said mandrel shank is drawn away from said blind rivet body; and
    securing said pipe repair plug into said sized hole by mechanically deforming said cylindrical sidewall by drawing said mandrel away from said blind rivet.

6. A pipe repair process as recited in claim 1, the process further comprising a step of placing a sectioned coupling member, said sectioned coupling member having a second sized hole, about said pipe, aligning said second sized hole with said sized hole of said pipe.

7. A pipe repair process as recited in claim 6, the process further comprising a step of forming a watertight seal between said pipe repair plug, said sectioned coupling member, and said pipe.

8. A pipe repair process as recited in claim 7, the process further comprising the step of repairing a second perforation wherein said sectioned coupling member is sized to cover both said sized hole and said second perforation, the step consisting of placing said sectioned coupling member in a manner to additionally cover said second perforation.

9. A pipe repair process, the process comprising the steps of:
- enlarging and shaping a perforation of a pipe wall to a sized hole having a diameter for receiving a pipe repair plug, said pipe repair plug comprising:
  - a malleable tubular cylindrical sidewall having a hollow interior section,
  - an end wall, wherein said end wall is contiguous about a peripheral edge of an insertion end of said cylindrical sidewall providing said a watertight attribute, and
  - a pipe repair plug flange formed about a perimeter of a flange end of said pipe repair plug body;
- inserting said cylindrical sidewall into said sized hole;
- obtaining a blind rivet, said blind rivet comprising:
  - a blind rivet body having a blind rivet tubular section and blind rivet flange formed about a perimeter of a flange end of said blind rivet body, and
  - a mandrel comprising a mandrel shank having a body expander at an expansion end of said mandrel, wherein said mandrel is assembled through said tubular section positioning such to expand a diameter of said blind rivet body when said mandrel shank is drawn away from said blind rivet body; and
- inserting said rivet shank into said hollow interior section; and
- securing said pipe repair plug into said sized hole by mechanically deforming said cylindrical sidewall by drawing said mandrel away from said blind rivet.

10. A pipe repair process as recited in claim 9, the process further comprising step of:
- seating said pipe repair plug flange against an exterior surface of said pipe wall.

11. A pipe repair process as recited in claim 10, the process further comprising steps of:
- obtaining a gasket seal, said gasket seal providing a gasket material in an annular configuration;
- inserting said gasket seal sandwiched between said pipe repair plug flange and said pipe wall exterior surface.

12. A pipe repair process as recited in claim 11, wherein the step of mechanically deforming said cylindrical sidewall by drawing said mandrel away from said blind rivet further draws said pipe repair plug flange and said pipe wall exterior surface together.

13. A pipe repair process as recited in claim 12, wherein the step of drawing said pipe repair plug flange and said pipe wall exterior surface together further deforms said pipe repair plug flange to contour to said pipe wall exterior surface.

14. A pipe repair process as recited in claim 9, the process further comprising a step of snapping a majority of said mandrel off during said drawing process.

15. A pipe repair process as recited in claim 9, the process further comprising a step of placing a sectioned coupling member, said sectioned coupling member having a second sized hole, about said pipe, aligning said second sized hole with said sized hole of said pipe.

16. A pipe repair process as recited in claim 15, the process further comprising a step of forming a watertight seal between said pipe repair plug, said sectioned coupling member, and said pipe by assembling said blind rivet, said pipe repair plug, said sectioned coupling member, and said pipe together.

17. A pipe repair process as recited in claim 16, the process further comprising the step of repairing a second perforation wherein said sectioned coupling member is sized to cover both said sized hole and said second perforation, the step consisting of placing said sectioned coupling member in a manner to additionally cover said second perforation.

18. A pipe repair process, the process comprising the steps of:
- enlarging and shaping a perforation of a pipe wall to a sized hole having a diameter for receiving a pipe repair plug, said pipe repair plug comprising:
  - a malleable tubular cylindrical sidewall having a hollow interior section,
  - an end wall, wherein said end wall is contiguous about a peripheral edge of an insertion end of said cylindrical sidewall providing a watertight attribute, and
  - a pipe repair plug flange formed about a perimeter of a flange end of said pipe repair plug body;
- inserting said cylindrical sidewall into said sized hole;
- obtaining a blind rivet, said blind rivet comprising:
  - a blind rivet body having a blind rivet tubular section and blind rivet flange formed about a perimeter of a flange end of said blind rivet body, and
  - a mandrel comprising a mandrel shank having a body expander at an expansion end of said mandrel, wherein said mandrel is assembled through said tubular section positioning such to expand a diameter of said blind rivet body when said mandrel shank is drawn away from said blind rivet body; and
- inserting said rivet shank into said hollow interior section; and
- obtaining a gasket seal, said gasket seal providing a gasket material in an annular configuration defining a gasket aperture;
- inserting said malleable tubular cylindrical sidewall through said gasket aperture;
- sandwiching said pipe repair plug flange, said gasket seal, and a pipe wall exterior surface together;
- securing said pipe repair plug into said sized hole by mechanically deforming said cylindrical sidewall and simultaneously drawing said pipe repair plug flange and said pipe wall exterior surface together by drawing said mandrel away from said blind rivet.

19. A pipe repair process as recited in claim 18, the process further comprising a step of soldering said rivet to said pipe to create a watertight seal.

20. A pipe repair process as recited in claim 18, the process further comprising a step of snapping a majority of said mandrel off during said drawing process.

* * * * *